Patented Apr. 27, 1954

2,676,990

UNITED STATES PATENT OFFICE 2,676,990

METHOD OF MAKING VITAMIN A AND INTERMEDIATES FORMED THEREBY

Wilbert J. Humphlett and Donald M. Burness, Rochester, N. Y., assignors to Eastman Kodak Company, Rochester, N. Y., a corporation of New Jersey No Drawing. Application September 11, 1951, Serial No. 246,165

13 Claims. (Cl. 260—598)

This invention relates to the synthesis of vitamin A and to vitamin A intermediates prepared in such syntheses.

The successful synthesis of vitamin A is dependent upon the discovery of a particular combination of method steps with particular reactants which combine to produce in good yield the complex and specific vitamin A molecular structure. The tendency of potential vitamin A intermediates to decompose, isomerize and undergo undesired side reactions has made the successful synthesis of vitamin A a difficult task which has been the subject of much intensive work for a number of years.

It is accordingly an object of this invention to provide a new and highly effective method of synthesizing vitamin A.

Another object of the invention is to provide a new combination of method steps which combine to produce the desired vitamin A molecular structure.

Another object of the invention is to provide an improved method of minimizing objectionable effects of decomposition, isomerization and side reactions normally attendant to vitamin A syntheses.

Another object of the invention is to provide a new and improved method of converting $\beta$-ionone to vitamin A alcohol.

Another object of the invention is to provide a new synthesis of vitamin A including Reformatsky or Grignard type reactions forming hydroxy compounds but adapted to overcome the losses in yield normally attendant to such syntheses due to isomerization during dehydration of such hydroxy compounds.

Another object of the invention is to provide a synthesis of vitamin A through hitherto unknown intermediates.

Another object of the invention is to provide new compounds useful in the synthesis of vitamin A.

Another object of the invention is to provide a new synthesis of vitamin A alcohol through vitamin A aldehyde.

Other objects will be apparent from the description and claims which follow.

These and other objects of the invention are attained by the process embodying this invention and comprising reacting $\beta$-ionone with a propargyl halide to form a carbinol, condensing the carbinol with an acetal of $\beta$-ketobutyraldehyde, preferably 4,4-dialkoxy-2-butanone, to form an acetylenic 3,7-diol acetal, hydrogenating the acetylenic 3,7-diol acetal to the corresponding olefinic 3,7-diol acetal, and converting the olefinic 3,7-diol acetal to vitamin A aldehyde which can thereafter be reduced to vitamin A alcohol, the converting being effected by either simultaneous or sequential dehydration, hydrolysis and treatment with basic material as described more fully hereinafter. Vitamin A alcohol as prepared by processes embodying the invention can, of course, be esterified by well-known esterification procedures to give vitamin A esters such as the acetate or palmitate or similar esters, in which form vitamin A is usually sold commercially.

The invention is illustrated by the following reactions and equations. The equations are set out as separate steps for illustrative purposes but it will be understood that one or more of the individual reactions can proceed in a single reaction mixture as described hereinafter, without isolation of the intermediates, although the intermediates can be isolated and the various steps carried out in succession if desired. In either case, various mechanisms may be advanced to explain the observed results without changing the operative steps set out.

As an initial step in the processes embodying the invention, $\beta$-ionone is reacted with a propargyl halide such as propargyl bromide, propargyl chloride or propargyl iodide to form the carbinol, 4 - methyl - 4 - hydroxy - 6 - (2,6,6-trimethyl cyclohex-1-enyl) hex-5-ene-1-yne. The reaction is effected by use of either zinc or magnesium, the use of magnesium being preferred particularly when the magnesium is catalyzed by a mercury-containing material whereby a magnesium-mercury amalgam is formed. The mercury can be introduced in elemental form or as a preformed amalgam with magnesium or as a mercury compound such as mercuric chloride or similar mercury salt. The reaction product is desirably hydrolyzed to decompose the metalloorganic complex to the carbinol. The reaction is illustrated by the following equation, wherein X is a halogen atom:

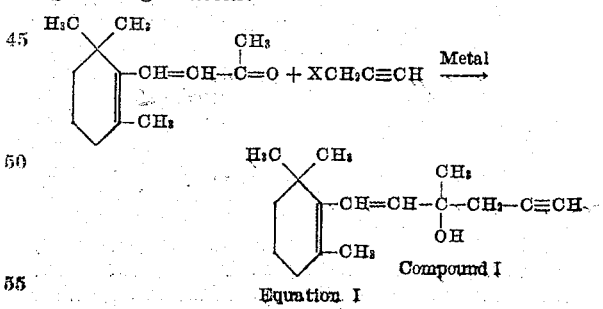

Equation I

The carbinol, Compound I, is then condensed with an acetal of β-ketobutyraldehyde such as a dialkyl, cyclic, aryl aralkyl or mixed acetal of β-ketobutyraldehyde, by means of a Grignard reaction to form an acetylenic 3,7-diol acetal, the product being 1,1-dialkoxy-3,7-dimethyl-3,7-dihydroxy-9 - (2,6,6 - trimethyl cyclohex - 1-enyl)-nona-8-ene-4-yne in a typical condensation employing a dialkyl acetal. The reaction is readily effected by means of any of the well-known Grignard reagents including the amides, alkyls or aryls of such metals as sodium, potassium, lithium, magnesium, cadmium and the like in accordance with usual condensation practices. The alkyl magnesium halides such as ethyl magnesium bromide are preferred, but any of the other strongly basic Grignard reagents can be employed. The nature of the acetal group in the acetal of β-ketobutyraldehydes does not affect the course of the reaction. Of the acetals, the dialkyl acetals are preferred and any 4,4-dialkoxy-2-butanone can be employed, the lower alkoxy compounds such as the dimethoxy, diethoxy, dipropoxy and dibutoxy compounds being preferred for convenience. The reaction is illustrated by the following equation, wherein R is an alkyl radical:

Compound I + $CH_3COCH_2CH(OR)_2$ $\xrightarrow{RMgX}$

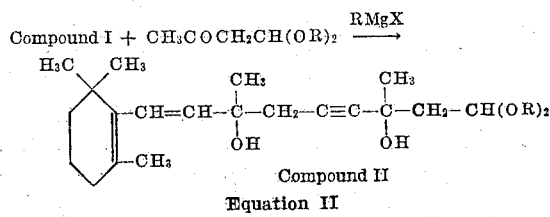

Compound II

Equation II

The acetylenic 3,7-diol acetal, Compound II, is thereafter hydrogenated to the corresponding olefinic 3,7-diol acetal, 1,1-dialkoxy-3,7-dimethyl-3,7 - dihydroxy - 9 - (2,6,6 - trimethyl cyclohex-1-enyl)-nona-4,8-diene, by partially hydrogenating the acetylenic linkage. The partial hydrogenation is readily effected by reacting approximately one molar equivalent of hydrogen with Compound II in the presence of a hydrogenation catalyst such as palladium, Raney nickel or similar well-known hydrogenation catalyst in accordance with usual hydrogenation practices. The reaction is illustrated graphically as follows:

Compound II + $H_2$ $\xrightarrow{Catalyst}$

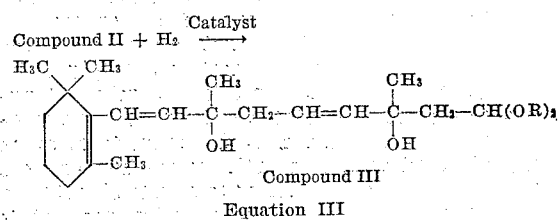

Compound III

Equation III

The olefinic 3,7-diol acetal, Compound III, is thereafter converted to vitamin A alcohol by dehydration, hydrolysis, rearrangement and reduction. In a preferred embodiment, Compound III is treated with a dehydrating agent which is either a phosphorous halide or oxyhalide to dehydrate and convert Compound III to the enol ether, 1 - alkoxy - 3,7 - dimethyl - 9 - (2,6,6-trimethyl cyclohex - 2 - ene - 1 - ylidene) - nona-1,3,5,7-tetraene. The reaction is effected by treating Compound III, in solution in a suitable solvent such as benzene, toluene, ether or the like, with a halide or oxyhalide dehydrating agent, and desirably in the presence of an amine, preferably a tertiary amine such as pyridine, lutidine or the like. Any of the well-known halide or oxyhalide dehydrating agents can be employed, typical dehydrating agents which are suitably employed including phosphorous oxychloride, benzene phosphorous oxydichloride, boron trifluoride, aluminum chloride, phosphorous pentachloride, stannic chloride and the like. Treatment with such dehydrating agents effects conversion of the acetal group to an unsaturated ether group simultaneously with the dehydration. The following equation illustrates the reaction:

Compound III $\xrightarrow[\text{Tert. Amine}]{\text{Dehydrating agent}}$

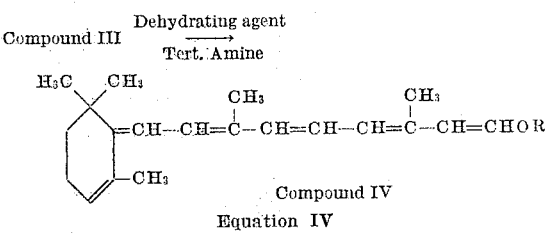

Compound IV

Equation IV

The unsaturated ether, Compound IV, is readily hydrolyzed to Compound V for which the structure set out in Equation V has been postulated by treatment with an ionizable acid in accordance with well-known hydrolysis practice, a mineral acid such as hydrochloric, sulfuric or the like in solvent media such as acetone, methyl ethyl ketone or the like being desirably employed, although dilute aqueous acid can be employed or such well-known acids as acetic acid or the like. Equation V is illustrative of the reaction:

Compound IV $\xrightarrow{H^+}$

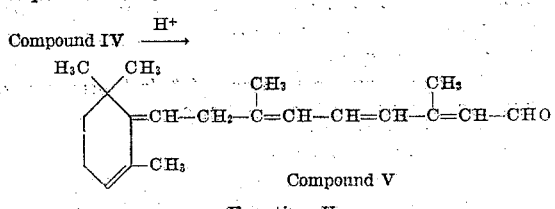

Compound V

Equation V

Compound V is then rearranged to vitamin A aldehyde by treating it with a basic catalyst such as a basic amine, an alkaline soap, an alkaline hydroxide, an alkaline adsorbent, an alkali metal alkoxide, a quaternary ammonium base, a basic metal hydride, a basic salt, or similar material of basic character. Typical materials of basic character suitable for catalyzing the rearrangement include pyridine, sodium hydroxide, potassium hydroxide, sodium aluminum silicate, aluminum isopropoxide, potassium acetate, lutidine, lithium aluminum hydride and other well-known basic materials. The rearrangement proceeds either at room temperature or at elevated temperatures with only a catalytic amount of basic material being necessary although larger amounts are not objectionable. By use of a basic adsorbent such as sodium aluminum silicate, Compound V is purified and rearranged simultaneously. Basic reducing agents such as the ether-soluble basic metal hydrides and aluminum alkoxides cause rearrangement and reduction in a single reaction mixture as described more fully hereinafter. The rearrangement is illustrated in the following equation:

Compound V $\xrightarrow{\text{Basic Catalyst}}$

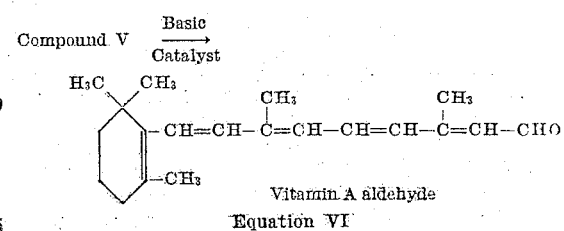

Vitamin A aldehyde

Equation VI

Vitamin A aldehyde is readily reduced to vitamin A alcohol by treatment with an ether-soluble metal hydride such as sodium aluminum hydride, lithium aluminum hydride, lithium borohydride or the like; by treatment with an aluminum alkoxide such as aluminum isopropoxide, aluminum tert.-butoxide or the like with the corresponding or other monohydric alcohol; or by other well-known method of reducing olefinic aldehydes to olefinic alcohols. The reduction is effected in accordance with usual reduction practices. In the case of the basic reducing agents, the aldehyde, Compound V, is desirably treated directly with the reducing agent whereby the basic reducing agent catalyzes the rearrangement to vitamin A aldehyde and reduction to vitamin A alcohol in a single reaction mixture.

The conversion of the olefinic 3,7-diol acetal, Compound III, to vitamin A alcohol by dehydration, hydrolysis, rearrangement and reduction is desirably effected in a preferred embodiment by treating Compound III with a mixture of a mineral acid and an organic base such as pyridine, lutidine, quinoline, morpholine, piperidine, or the like; or by a mineral acid-organic base addition product such as pyridine hydrochloride or the like, whereby Compound III is dehydrated, hydrolyzed and rearranged to vitamin A aldehyde in a single reaction mixture, the vitamin A aldehyde then being reduced to vitamin A alcohol as described hereinabove.

The invention is illustrated by the following examples of preferred embodiments. In accordance with usual practice, all E values in the following examples were determined in ethanol solution.

Example 1

The carbinol, Compound I, was prepared as follows: A mixture of 37.4 g. of iodine-activated zinc and 0.1 g. of copper ethyl acetoacetate was placed in a 3-necked flask equipped with a stirrer, a reflux condenser and a dropping funnel. To this was added 40 ml. of a solution of 64 g. of β-ionone, 37.4 g. of propargyl bromide and 0.2 g. of hydroquinone in 100 ml. of absolute ether, and the resulting mixture was heated to initiate the reaction. The remaining 60 ml. of solution was diluted with 200 ml. of absolute ether and 22 ml. of absolute benzene, and the diluted solution was added to the reaction mixture over a 30 minute period, the reaction mixture being refluxed and stirred during the addition. When the addition was completed, the refluxing was continued for 30 minutes. A 250 ml. portion of 3 N sulfuric acid was then added to the reaction mixture to decompose the zinc complex, the mixture being cooled in an ice-water bath during the addition. The reaction mixture was then filtered and the filtrate extracted with ether. The aqueous phase was saturated with sodium chloride and extracted three times with ether. The combined ether extracts were then washed with sodium bicarbonate solution and with water, and then dried over anhydrous sodium sulfate. The solvent was removed to give 77.7 g. of crude Compound I having $$E_{1\,cm.}^{1\%} (232\ m\mu) = 251$$

and $$E_{1\,cm.}^{1\%} (284\ m\mu) = 198$$

The product was purified by chromatography on synthetic sodium aluminum silicate to give 61.4 g. of Compound I having $$E_{1\,cm.}^{1\%} (232\ m\mu) = 242$$

Example 2

Compound I was similarly prepared using magnesium instead of zinc according to the following procedure. A mixture of 1.2 g. of magnesium foil, 10 ml. of dry ether and 75 mg. of mercuric chloride was placed in a 200 ml. 3-necked flask equipped with a stirrer, reflux condenser and dropping funnel. A mixture of 9.1 g. of β-ionone and 5.9 g. of propargyl bromide was dissolved in 35 ml. of dry ether, and the resulting solution poured into the flask. The reaction mixture was then warmed to gentle reflux for 5–10 minutes to initiate the reaction. The reaction, once initiated, proceeded vigorously without heating and spontaneous reflux continued for 30 minutes during which time the reaction was controlled by cooling in an ice-water bath. Following the spontaneous reflux, the mixture was heated to reflux for an additional 30 minutes, the mixture being stirred during that time. The reaction product at that time was a clear light yellow solution. The magnesium complex was decomposed to Compound I by the cautious addition of 5% sulfuric acid solution while the mixture was cooled in ice water. The ether phase was then separated from the aqueous phase, and the aqueous phase was saturated with sodium chloride and extracted three times with ether. The ether extracts were combined, washed twice with saturated sodium bicarbonate solution and the sodium bicarbonate solution extracted with ether. The ether extracts were combined, dried over anhydrous sodium sulfate and the ether removed to give 11.25 g. of yellow slightly viscous product having $$E_{1\,cm.}^{1\%} (232\ m\mu) = 234$$

This crude product was chromatographed on activated alumina to give 10.57 g. of Compound I having $$E_{1\,cm.}^{1\%} (232\ m\mu) = 240$$

Example 3

Compound I was similarly prepared from propargyl iodide. A 0.6 g. portion of magnesium turnings was mixed with 4.55 g. of β-ionone, 4.1 g. of propargyl iodide, 0.035 g. of mercuric chloride and 25 ml. of dry ether. The mixture was heated at 60° C. until the reaction was initiated. The mixture was cooled in an ice-water bath and refluxed spontaneously for 30 minutes, after which time, it was refluxed on an oil bath for an additional 45 minutes. The mixture was then cooled, poured onto crushed ice and diluted with 25 ml. of cold 3 N. sulfuric acid. The product was extracted with ether, and the ether extract washed successively with water, saturated sodium bicarbonate solution and water. The washed extract was dried over sodium sulfate and the ether blown off under nitrogen to give 5.18 g. of Compound I as a clear yellow slightly viscous liquid.

Example 4

The carbinol, Compound I, was condensed with 4,4-dialkoxy-2-butanone in the following manner to form the acetylenic 3,7-diol acetal, Compound II. Fifty ml. of absolute ether containing 25.42 g. of Compound I was slowly added over a 30 minute period to 92.7 ml. of an ether solution containing 0.2306 mole of ethyl magnesium bromide. The resulting solution was refluxed and stirred for 5 hours. The solution was then cooled to 0° C. and to it was added 18.2 g. of 4,4-dimethoxy-2-butanone (B. P. 49–50° C. at 6 mm. pressure) in 50 ml. of absolute ether, the addition taking one hour and resulting in the formation of a white gummy product. After standing overnight at 4° C., the reaction mixture was diluted with 150 ml. of saturated ammonium chloride solution to decompose the magnesium complex to the acetylenic 3,7-diol acetal. The ether and aqueous phases were separated, and the aqueous phase was extracted three times with ether. The combined ether phases were dried over anhydrous sodium sulfate and the solvent removed by evaporation. Excess 4,4-dimethoxy-2-butanone was removed from the residue at 60° C. under vacuum to give 40.1 g. of crude Compound II which was purified by chromatography to give 36.3 g. of yellow, viscous Compound II having $$E_{1\,cm.}^{1\%} (232\ m\mu) = 146$$

and $n^{25} = 1.4995$.

Example 5

The acetylenic 3,7-diol acetal, Compound II, was hydrogenated to the olefinic 3,7-diol acetal, Compound III, by dissolving 3.5 g. of Compound II in 35 ml. of methanol containing 3 drops of quinoline and 0.2 g. of 5% palladium-charcoal and passing hydrogen into the solution. Absorption of hydrogen practically ceased after 6 minutes when 1.0 molecular equivalent had been absorbed, and the addition of hydrogen was discontinued after 18 minutes, during which time 1.05 molecular equivalents (244 ml.) of hydrogen had been absorbed. The reaction mixture was then diluted with 100 ml. of petroleum ether and filtered to remove the catalyst. The ether phases were washed with 5% sulfuric acid, dilute sodium bicarbonate solution and water. After drying over anhydrous sodium sulfate, the solvent was evaporated leaving 3.41 g. of Compound III as a yellow viscous oil having $$E_{1\,cm.}^{1\%} (232\ m\mu) = 157$$

Example 6

A 6.6 g. portion of dry pyridine was placed in a 40 ml. flask equipped with a reflux condenser, dropping funnel and stirrer. To this was added 1.19 ml. of phosphorous oxychloride in 10 ml. of toluene, the mixture being cooled during such addition. A solution of 1.83 g. of Compound III in 5.0 ml. of toluene was then added and the resulting reaction mixture was heated at 90–95° C. for 75 minutes with rapid stirring. The resulting red reaction mixture was cooled and stirred into 30 g. of crushed ice and ether. The aqueous phase was separated from the ether phase, and the aqueous phase was extracted six times with ether. The ether phases were combined, washed successively with saturated potassium carbonate solution, 5% sulfuric acid, saturated sodium bicarbonate solution, and dried over anhydrous sodium sulfate. Evaporation of the solvent under vacuum gave 1.5 g. of Compound IV, as a red residue having $$E_{1\,cm.}^{1\%} (372\ m\mu) = 1080$$

The product was purified by chromatography on synthetic sodium aluminum silicate to give 0.78 g. of viscous yellow product having $$E_{1\,cm.}^{1\%} (372\ m\mu) = 1800$$

Example 7

A mixture of 7 ml. of pyridine and 10 ml. of anhydrous toluene containing 2.7 g. of benzene phosphorous oxydichloride was placed in a 50 ml. flask equipped with a stirrer and a condenser. To this mixture was added 5 ml. of toluene containing 1.83 g. of the olefinic, 3,7-diol acetal, Compound III. The resulting reaction mixture was heated at 90–95° C. for 75 minutes and then poured onto 20 g. of crushed ice. The aqueous phase was made basic with potassium carbonate and then extracted three times with ether. The ether extracts were combined and washed successively with potassium carbonate solution, 10% sulfuric acid, saturated sodium bicarbonate solution, and water. The extract was then dried and the solvent removed by evaporation to give 1.27 g. of Compound IV, having $$E_{1\,cm.}^{1\%} (372\ m\mu) = 790$$

Example 8

Compound IV was hydrolyzed to Compound V, by refluxing for 15 minutes a solution of 0.6 g. of Compound IV in 5 ml. of acetone containing one drop of concentrated hydrochloric acid. The acetone was then removed by evaporation and the residue taken up in ether. The ethereal solution was washed successively with saturated sodium bicarbonate solution and water, dried over anhydrous sodium sulfate and the ether removed by evaporation to give 0.58 g. of Compound V as a red oil having $$E_{1\,cm.}^{1\%} (328\ m\mu) = 900$$

Example 9

Compound V, prepared in Example 8 was rearranged to vitamin A aldehyde by chromatography on the basic adsorbent, synthetic sodium aluminum silicate, to give 0.5 g. of vitamin A aldehyde having $$E_{1\,cm.}^{1\%} (377\ m\mu) = 1115$$

Example 10

A 1.0 g. portion of Compound V having $$E_{1\,cm.}^{1\%} (328\ m\mu) = 794$$

was dissolved in 5 cc. of benzene to which was added 10 drops of pyridine. The mixture was allowed to stand overnight at room temperature whereupon Compound V was rearranged to vitamin A aldehyde having E max. = 370 m$\mu$.

Example 11

An 0.8 g. sample of Compound V was dissolved in 6 cc. of ethanol and 9 drops of 0.5 N. potassium hydroxide solution were added to the solution. The resulting mixture was allowed to stand at room temperature for 3 hours, and the product was washed with water and dried over sodium sulfate to give vitamin A aldehyde having $$E_{1\,cm.}^{1\%} (370\ m\mu) = 527$$

Example 12

An 0.84 g. portion of vitamin A aldehyde dissolved in 20 ml. of absolute isopropyl alcohol was added to 10 ml. of absolute isopropyl alcohol containing 1.85 g. of aluminum isopropoxide. The resulting mixture was refluxed at a rate effective to give 10 drops of distillate per minute, additional isopropyl alcohol being added to maintain the volume. After 30 minutes, the distillate no longer gave a positive acetone test with 2,4-dinitrophenyl-hydrazine reagent. The reaction mixture was refluxed for an additional 30 minutes and most of the excess isopropyl alcohol was removed under slightly reduced pressure. The residue was cooled, hydrolyzed with cold 5% hydrochloric acid, and extracted with ether. The extract was stabilized with a few crystals of hydroquinone, and then washed successively with saturated sodium bicarbonate solution and water. After being dried, the extract was evaporated to remove the solvent giving 0.85 g. of vitamin A alcohol concentrate as a viscous reddish oil having $$E^{1\%}_{1\,cm.} (325 \text{ m}\mu) = 1175$$

and a potency by blue color test of 2,120,000 units of vitamin A per gram.

Example 13

A preferred embodiment of the invention includes treating Compound V, with a basic reducing agent and rearranging Compound V to vitamin A aldehyde and reducing the vitamin A aldehyde to vitamin A alcohol in a single reaction mixture. In a typical example, 0.63 g. of Compound V dissolved in 6.3 ml. of anhydrous ether was placed in a 40 ml. 3-necked flask equipped with a stirrer, dropping funnel and reflux condenser. To this solution was added as rapidly as possible, 3.8 ml. of a 1 M. ethereal solution of lithium aluminum hydride diluted with 3.8 ml. of anhydrous ether. The addition was completed over a period of about 30 seconds during which time the reaction mixture refluxed vigorously. After the addition was completed, the mixture was stirred for one minute, and the excess lithium aluminum hydride was then decomposed by the addition of wet acetone and dilute hydrochloric acid. The mixture was extracted with ether and the ether extract was washed successively with sodium bicarbonate solution and water. The extract was dried over anhydrous sodium sulfate and the solvent removed by evaporation to give a concentrate of vitamin A alcohol having $$E^{1\%}_{1\,cm.} (328 \text{ m}\mu) = 566$$

Example 14

Simultaneous rearrangement and reduction of Compound V was also effected with aluminum alkoxide. To a suspension of 1.35 g. of aluminum isopropoxide in 10 ml. of isopropyl alcohol was added 0.61 g. of Compound V dissolved in 25 ml. of isopropyl alcohol. The resulting reaction mixture was refluxed until the distillate gave a negative acetone test with 2,4-dinitrophenyl hydrazine. The excess alcohol was then distilled off under vacuum, the residue was cooled and the excess aluminum isopropoxide was decomposed by the addition of 20 ml. of 10% sulfuric acid. The mixture was extracted with ether and the ether extract washed to neutrality with water. The ether was removed by evaporation to give a concentrate of vitamin A alcohol having $$E^{1\%}_{1\,cm.} (328 \text{ m}\mu) = 690$$

Example 15

The conversion of the olefinic 3,7-diol acetal, Compound III, to vitamin A alcohol is desirably effected in a preferred embodiment by treating Compound III with a mixture of a mineral acid and an organic base whereby dehydration, hydrolysis and rearrangement are effected in a single reaction mixture to form vitamin A aldehyde which can then be reduced as described hereinabove. Thus, in a typical example, 40 cc. of methyl ethyl ketone containing 1.45 g. of quinoline and 20 cc. of methyl ethyl ketone containing 1.17 g. of concentrated hydrochloric acid were added to a solution of 11.0 g. of Compound III in 80 cc. of methyl ethyl ketone. The resulting reaction mixture was refluxed for 90 minutes, cooled, poured into 500 cc. of water and extracted with ether. The ether extract was washed successively with 5% hydrochloric acid, 0.5 N. potassium hydroxide, and water. The washed extract was then dried and evaporated to give 8.7 g. of vitamin A aldehyde as a reddish oil having $$E^{1\%}_{1\,cm.} (372 \text{ m}\mu) = 870$$

Example 16

Compound III was similarly converted to vitamin A aldehyde by refluxing for 2 hours a mixture of 1.0 g. of Compound III, 0.092 g. of pyridine and 0.117 g. of concentrated hydrochloric acid in 12 cc. of methyl ethyl ketone. The product was worked up as in the preceding example, and the vitamin A aldehyde concentrate obtained thereby had $$E^{1\%}_{1\,cm.} (369 \text{ m}\mu) = 716$$

Example 17

A 1.0 g. portion of Compound III was refluxed in 12 cc. of methyl ethyl ketone containing 0.1 g. of piperidine and 0.117 g. of concentrated hydrochloric acid. After a 2 hour reflux, crude vitamin A aldehyde having $$E^{1\%}_{1\,cm.} (368 \text{ m}\mu) = 610$$

was obtained.

Example 18

Vitamin A aldehyde is readily reduced to vitamin A alcohol by use of an ether-soluble metal hydride as reducing agent. Thus, 0.6 ml. of a 1 M. ethereal solution of lithium aluminum hydride was diluted with 0.6 ml. of anhydrous ether and the diluted solution was added over a 30 second interval to 0.32 g. of vitamin A aldehyde dissolved in 3.2 ml. of absolute ether. Following the addition, the mixture was stirred for 2 minutes and the excess lithium aluminum hydride was decomposed with water. The product was worked up to give 0.35 g. of vitamin A alcohol having $$E^{1\%}_{1\,cm.} (326 \text{ m}\mu) = 1100$$

and a blue color potency of 2,010,000 units of vitamin A per gram.

The invention thus provides a new and improved synthesis of vitamin A-active material without objectionable yield losses due to dehydration isomerism.

The invention has been described in considerable detail with reference to certain preferred embodiments, but it will be understood that variations and modifications can be effected within the spirit and scope of the invention as described hereinabove and as defined in the appended claims.

We claim:

1. The method of making vitamin A aldehyde, which is convertible to vitamin A alcohol by reduction, which comprises reacting β-ionone with a propargyl halide in the presence of a metal selected from the class consisting of zinc and mercury-activated magnesium and thereby forming the carbinol, 4-methyl-4-hydroxy-6-(2,6,6-trimethyl cyclohex-1-enyl) hex-5-ene-1-yne, condensing said ethinyl carbinol with 4,4-dialkoxy-2-butanone and thereby forming the acetylenic 3,7-diol acetal, 1,1-dialkoxy-3,7-dimethyl-3,7-dihydroxy-9-(2,6,6-trimethyl cyclohex-1-enyl)-nona-8-ene-4-yne, partially hydrogenating the acetylenic linkage of said acetylenic 3,7-diol acetal and thereby converting said acetylenic 3,7-diol acetal to the corresponding olefinic 3,7-diol acetal, 1,1-dialkoxy-3,7-dimethyl- 3,7 - dihydroxy - 9 - (2,6,6 - trimethyl cyclohex-1-enyl)-nona-4,8-diene, and converting said olefinic 3-7-diol acetal to vitamin A aldehyde by dehydrating and hydrolyzing said olefinic 3,7-diol acetal and treating the resulting product with a basic material.

2. The method of making vitamin A aldehyde, which is convertible to vitamin A alcohol by reduction, which comprises reacting β-ionone with a propargyl halide in the presence of a metal selected from the class consisting of zinc and mercury-activated magnesium and thereby forming the carbinol, 4-methyl-4-hydroxy-6-(2,6,6-trimethyl cyclohex-1-enyl) hex-5-ene-1-yne, condensing said carbinol with 4,4-dialkoxy-2-butanone and thereby forming the acetylenic 3,7-diol acetal, 1,1-dialkoxy-3,7-dimethyl-3,7-dihydroxy-9-(2,6,6-trimethyl cyclohex-1-enyl)-nona-8-ene-4-yne, partially hydrogenating the acetylenic linkage of said acetylenic 3,7-diol acetal and thereby forming the olefinic 3,7-diol acetal, 1,1-dialkoxy-3,7-dimethyl-3,7-dihydroxy-9 - (2,6,6 - trimethyl cyclohex - 1 - enyl) - nona-4,8-diene, and converting said olefinic 3,7-diol acetal to vitamin A aldehyde, said converting being effected by treating said olefinic 3,7-diol acetal with a dehydrating agent selected from the class consisting of halides and oxyhalides and thereby forming the unsaturated ether, 1-alkoxy-3,7-dimethyl-9-(2,6,6-trimethyl cyclohex-2-ene-1-ylidene)-nona-1,3,5,7-tetraene, hydrolyzing said unsaturated ether and treating the product of said hydrolyzing with a basic catalyst and thereby forming vitamin A aldehyde.

3. In the method of making vitamin A, the combination of steps which comprises reacting β-ionone with a propargyl halide in the presence of a metal selected from the class consisting of zinc and mercury-activated magnesium and thereby forming the carbinol, 4 - methyl - 4 - hydroxy-6-(2,6,6 - trimethyl cyclohex-1-enyl) hex-5-ene-1-yne, condensing said carbinol with 4,4-dialkoxy-2-butanone and thereby forming the acetylenic 3,7 - diol acetal, 1,1 - dialkoxy - 3,7-dimethyl-3,7-dihydroxy-9-(2,6,6-trimethyl cyclohex-1-enyl)-nona-8-ene-4-yne, partially hydrogenating the acetylenic linkage of said acetylenic 3,7-diol acetal and thereby forming the olefinic 3,7-diol acetal, 1,1-dialkoxy-3,7-dimethyl-3,7-dihydroxy-9-(2,6,6-trimethyl cyclohex-1-enyl)-nona-4,8-diene, treating said olefinic 3,7-diol acetal with a dehydrating agent selected from the class consisting of halides and oxyhalides and thereby forming the ether, 1-alkoxy-3,7-dimethyl-9-(2,6,6-trimethyl cyclohex-2-ene-1-ylidene)-nona-1,3,5,7-tetraene, and hydrolyzing said ether and thereby obtaining a product which is convertible to vitamin A alcohol by reduction with a basic reducing agent.

4. The method of making vitamin A aldehyde, which is convertible to vitamin A alcohol by reduction which comprises reacting β-ionone with a propargyl halide in the presence of a metal selected from the class consisting of zinc and mercury-activated magnesium and thereby forming the carbinol, 4 - methyl - 4 - hydroxy - 6 - (2,6,6-trimethyl cyclohex-1-enyl) hex-5-ene-1-yne, condensing said carbinol with 4,4-dialkoxy-2-butanone and thereby forming the acetylenic 3,7-diol acetal, 1,1-dialkoxy-3,7-dimethyl-3,7-dihydroxy-9-(2,6,6-trimethyl cyclohex-1-enyl)-nona-8-ene-4-yne, partially hydrogenating the acetylenic linkage of said acetylenic 3,7-diol acetal and thereby forming the olefinic 3,7-diol acetal, 1,1-dialkoxy-2,7-dimethyl-3,7-dihydroxy-9-(2,6,6-trimethyl cyclohex-1-enyl)-nona-4,8-diene, and converting said olefinic 3,7-diol acetal to vitamin A aldehyde, said converting being effected by treating said olefinic 3,7-diol acetal with an ionizable acid and an organic base.

5. In the synthesis of vitamin A including converting an olefinic 3,7-diol acetal to vitamin A aldehyde by dehydration and hydrolysis, the combination of steps which comprises reacting β-ionone with propargyl bromide in the presence of magnesium activated by a catalytic amount of a mercury-containing material and thereby forming the carbinol, 4-methyl-4-hydroxy-6-(2,6,6-trimethyl cyclohex-1-enyl) hex-5-ene-1-yne, subjecting said carbinol to a Grignard reaction with 4,4-dialkoxy-2-butanone and thereby forming the acetylenic 3,7-diol acetal, 1,1-dialkoxy - 3,7 - dimethyl - 3,7 - dihydroxy - 9-(2,6,6-trimethyl cyclohex-1-enyl)-nona-8-ene-4-yne, and partially hydrogenating the acetylenic linkage of said acetylenic 3,7-diol acetal by reacting said acetylenic 3,7-diol acetal with a molar equivalent of hydrogen in the presence of a hydrogenation catalyst and thereby forming the olefinic 3,7-diol acetal, 1,1-dialkoxy-3,7-dimethyl-3,7 - dihydroxy - 9 -(2,6,6-trimethyl cyclohex - 1-enyl)-nona-4,8-diene.

6. The method of making vitamin A which comprises reacting β-ionone with a propargyl halide in the presence of a metal selected from the class consisting of zinc and mercury-activated magnesium and thereby forming a carbinol, subjecting said carbinol to a Grignard reaction with an acetal of β-ketobutyraldehyde and thereby forming an acetylenic 3,7-diol acetal, partially hydrogenating the acetylenic linkage of said acetylenic 3,7-diol acetal and thereby forming the corresponding olefinic 3,7-diol acetal, converting said olefinic 3,7-diol acetal to vitamin A aldehyde, and reducing said vitamin A aldehyde to vitamin A alcohol.

7. The method of making vitamin A which comprises reacting β-ionone with propargyl bromide in the presence of magnesium and a catalytic amount of a mercury compound and thereby forming the carbinol, 4-methyl-4-hydroxy-6-(2,6,6-trimethyl cyclohex-1-enyl) hex-5-ene-1-yne, subjecting said carbinol to a Grignard reaction with 4,4-dialkoxy-2-butanone and thereby forming the acetylenic 3,7-diol acetal, 1,1-dialkoxy - 3,7 - dimethyl - 3,7 - dihydroxy - 9-(2,6,6-trimethyl cyclohex-1-enyl)-nona-8-ene-4-yne, reacting said acetylenic 3,7-diol acetal with one molar equivalent of hydrogen in the presence of a hydrogenation catalyst and thereby forming the olefinic 3,7-diol acetal, 1,1-dialkoxy-3,7-dimethyl - 3,7 - dihydroxy - 9 - (2,6,6 - trimethyl cyclohex-1-enyl)-nona-4,8-diene, treating said olefinic 3,7-diol acetal with phosphorous oxychloride and thereby forming the ether, 1-alkoxy-3,7-dimethyl-9-(2,6,6-trimethyl cyclohex-2-ene-1-ylidene)-nona-1,3,5,7-tetraene, hydrolyzing said ether with mineral acid, and reacting the product of said hydrolyzing with a basic reducing agent and thereby forming vitamin A alcohol.

8. The method of making vitamin A which comprises reacting β-ionone with propargyl bromide in the presence of a magnesium amalgam and thereby forming the carbinol, 4-methyl-4-hydroxy - 6 - (2,6,6-trimethyl cyclohex - 1 - enyl) hex-5-ene-1-yne, subjecting said carbinol to a Grignard reaction with 4,4-dialkoxy-2-butanone and thereby forming the acetylenic 3,7-diol acetal, 1,1 - dialkoxy - 3,7 - dimethyl - 3,7 - dihydroxy-9-(2,6,6-trimethyl cyclohex-1-enyl)-nona-8-ene- 4-yne, reacting said acetylenic 3,7-diol acetal with one molar equivalent of hydrogen in the presence of a hydrogenation catalyst and thereby forming the olefinic 3,7-diol acetal, 1,1-dialkoxy-3,7 - dimethyl - 3,7 - dihydroxy-9-(2,6,6-trimethyl cyclohex-1-enyl)-nona-4,8-diene, treating said olefinic 3,7-diol acetal with a mixture of an organic base and a mineral acid and thereby forming vitamin A aldehyde, and reducing said vitamin A aldehyde to vitamin A alcohol.

9. 1,1 - dialkoxy - 3,7 - dimethyl - 3,7 - dihydroxy-9-(2,6,6-trimethyl cyclohex-1-enyl)-nona-8-ene-4-yne.

10. 1,1 - dialkoxy - 3,7 - dimethyl - 3,7-dihydroxy-9-(2,6,6-trimethyl cyclohex-1-enyl)-nona-4,8-diene.

11. The method of making vitamin A which comprises reacting β-ionone with propargyl bromide in the presence of a metal selected from the class consisting of zinc and mercury-activated magnesium, subjecting the product of said reacting to a Grignard reaction with a dialkyl acetal of β-ketobutyraldehyde, reacting the product of said Grignard reaction with a molar equivalent of hydrogen in the presence of a hydrogenation catalyst, dehydrating and hydrolyzing the resulting partially hydrogenated material to aldehydic material, and reducing said aldehydic material to vitamin A alcohol with a basic reducing agent.

12. The method of making vitamin A which comprises reacting β-ionone with a propargyl halide in the presence of mercury-activated magnesium, condensing the product of said reacting with 4-4-dialkoxy-2-butanone by means of a Grignard reaction, partially hydrogenating the resulting acetylenic 3,7-diol acetal to the corresponding olefinic 3,7-diol acetal, heating said olefinic 3,7-diol acetal with an ionizable acid and an organic base and thereby forming vitamin A aldehyde, and reducing said vitamin A aldehyde to vitamin A alcohol.

13. In the synthesis of vitamin A-active material, the combination of steps which comprises reacting β-ionone with a propargyl halide in the presence of a metal selected from the class consisting of zinc and mercury-activated magnesium and thereby forming a carbinol, subjecting said carbinol to a Grignard reaction with an acetal of β-ketobutyraldehyde and thereby forming an acetylenic 3,7-diol acetal, partially hydrogenating the acetylenic linkage of said acetylenic 3,7-diol acetal and thereby forming the corresponding olefinic 3,7-diol acetal, and dehydrating and hydrolyzing said olefinic 3,7-diol acetal and thereby converting said olefinic 3,7-diol acetal to vitamin A aldehyde.

References Cited in the file of this patent

UNITED STATES PATENTS

| Number | Name | Date |
|---|---|---|
| 2,451,740 | Lindlar | Oct. 19, 1948 |
| 2,577,538 | Milas | Dec. 4, 1951 |
| 2,586,305 | Copenhaver | Feb. 19, 1952 |
| 2,615,922 | Starke | Oct. 28, 1952 |

OTHER REFERENCES

Heilbron, Chem. Soc. J. (London), Year 1948, pp. 386–393.

Isler, Chimia, vol. 4, May 1950, pp. 114, 115.

Golse et al., Bulletin Societe Chimique de France, 1950, pp. 285–288.